United States Patent [19]

Haven

[11] Patent Number: 5,359,971
[45] Date of Patent: Nov. 1, 1994

[54] ROTARY STEAM/INTERNAL COMBUSTION ENGINE AND ROTARY HYDRAULIC MOTOR

[76] Inventor: Espie Haven, 102 N. Vine, Ashland City, Tenn. 37015

[21] Appl. No.: 57,856
[22] Filed: May 7, 1993
[51] Int. Cl.⁵ .............................................. F02B 53/00
[52] U.S. Cl. ...................................... 123/200; 60/669; 60/39.53; 418/227; 418/266
[58] Field of Search ................ 60/669, 514, 39.05, 60/39.53, 39.55; 123/204, 200; 418/225, 227, 266

[56] References Cited
U.S. PATENT DOCUMENTS

| | | | |
|---|---|---|---|
| 708,566 | 9/1902 | Lockerby | 418/266 |
| 1,002,059 | 8/1911 | Heyen | 418/266 |
| 3,824,045 | 7/1974 | Wisniewski et al. | 418/266 |
| 4,213,299 | 7/1980 | Sharar | 60/669 |
| 5,146,741 | 9/1992 | Sood | 60/39.55 |

Primary Examiner—Richard A. Bertsch
Assistant Examiner—Charles G. Freay

[57] ABSTRACT

A self starting, quick start-up rotary steam/internal combustion engine and a rotary hydraulic motor, with a positive displacement, powered through 360° of each revolution and comprising: a flattened cylindrical flywheel with two diametrically opposed, retractable, hinged power vanes that move through a 90° rotation; a drive shaft connected to the flywheel; an engine housing covering the flywheel, power chamber, exhaust chamber and transition chamber; a "combination backstop for the power chamber and lifter/release for the power vanes"; and means for a continuous internal generation of steam, means for a continuous internal combustion and means for introducing pressurized hydraulic fluid into the power chamber.

9 Claims, 4 Drawing Sheets

ROTARY STEAM/INTERNAL COMBUSTION ENGINE AND ROTARY HYDRAULIC MOTOR

BACKGROUND OF THE INVENTION

1. Field of the Invention

This invention relates to engines in general and in particular to a rotary steam engine, a rotary internal combustion engine and a rotary hydraulic motor, with a positive displacement by the working fluid, powered through 360° of each revolution, having a quick self start-up and means for: continuous internal generation of steam, continuous internal combustion and the continuous introduction of pressurized hydraulic fluid.

2. Prior Art

The most closely related patent found was Britain patent No. 16,643, dated 1891. Although the basic concept of the patent was similar to the present invention, my invention is found to have several superior features, namely:

a. The vanes of the prior art are deficient and incapable of handling any practical thrust upon the vanes, which would be multiplied by a factor of 20:1 or more by the leverage of the vane upon the hinge pin, which would be unable to sustain the resulting force. My vanes, on the other hand, have been designed to minimize the leverage force on the hinge pin, limiting the multiplying factor to a maximum of 2:1, well within the limits of practicality.

b. Wheras the prior art engine relies upon externally generated steam for its motive force, my invention employs means of a continuous internal generation of steam, with the inherent advantages of a quick start-up and weight reduction by the elimination of the external boiler and steam pressure tank.

c. The prior art engine has an interrupted supply of steam wheras my invention employs a continuous supply of steam with no interruption of motive force over 360° of each revolution.

d. In addition to the interrupted supply of steam, the inlet control recesses in the flywheel and the small inlet and outlet ports combine to introduce undesirable restrictions on the free passage of steam shown in the prior art; my invention has no such restrictions.

In light of these superior features, I submit that my invention represents an improvement over the prior art.

SUMMARY OF THE INVENTION

It is a principal object of the present invention to provide a quick start-up and an internal continuous generation of steam. The importance of this becomes apparent when one considers that this feature places the invention in a position to compete with and to possibly replace the conventional reciprocating internal combustion engine in its many applications.

Another object of this invention is a higher degree of efficiency.

Another object of the invention is to be self-starting; no starter is required.

Still another object of the present invention is the ease of manufacturing and the lower fabricating cost.

And yet another object of this invention is that, opposed to the internal combustion reciprocating engine, the fuel of which is generally restricted to gasoline, this invention will operate on a variety of fuels. This will result in conserving the national reserve of oil and gasoline and to lessen our dependence on foreign suppliers.

Another object of the invention is the elimination of the need for oil for lubrication. This results not only in further conservation of oil as cited above, but also the elimination of polluting emissions from oil contaminants in the exhaust.

Another object of the invention is a lower internal operating temperature. This results in a higher degree of efficiency due to less loss of heat energy contained in the exhaust gas. Another beneficial result is diminished metal fatigue, enhancing the dependability and longer life of the invention.

Another object of the invention is that it is virtually non-polluting and environmentally safe.

A final object of the invention is that it lends itself readily to a cellular, modular or "stacking" construction.

These objects are accomplished by the persent invention, comprising a flattened cylindrical flywheel connected to a drive shaft and enclosed by an engine housing, larger in diameter than the diameter of the flywheel so as to provide space between the rim of the flywheel and the rim of the engine housing for the power chamber, exhaust chamber and the transition chamber. Hinged to the rim of the flywheel are two diametrically opposed power vanes, each of which retracts into a recess and a cavity in the flywheel in order to pass over a stationary cam-like device called the "combination power chamber backstop and lifter/release for power vanes", which releases the power vanes for a 90° rotation into the power chamber to pick up a continuous internal generation of positive displacement steam.

The features and advantages of the present invention will become apparent from the following detailed description of the invention when read with the accompanying drawings.

DETAILED DESCRIPTION

Figure 1:
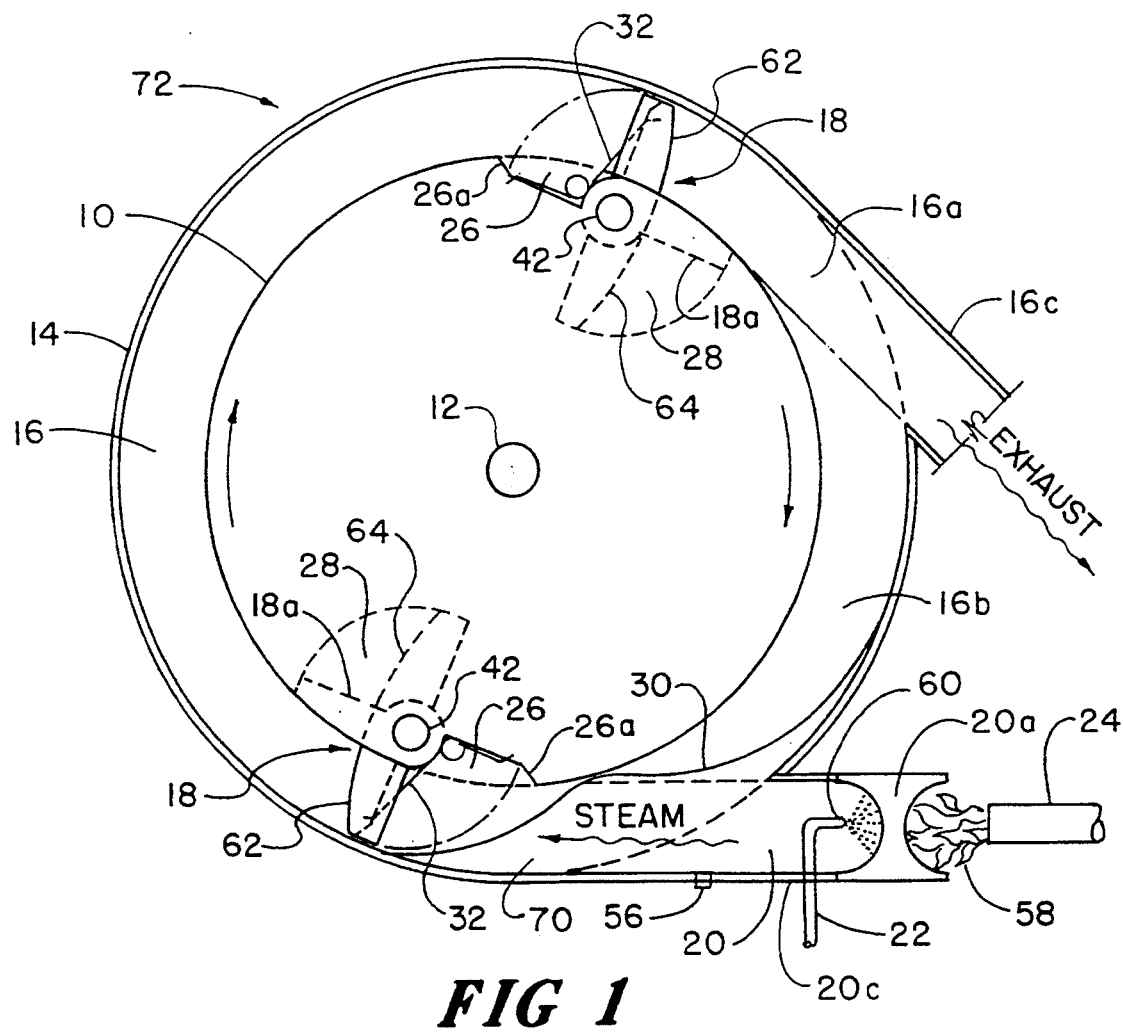
FIG. 1. is a plan view of the invention, with the top cover plate removed.

Refer now to FIG. 1, which is an overall view of a preferred embodiment of the invention.

We see a means of generating a continuous supply of steam internally, beginning with pipe 24 which supplies flammable gas (or vaporized liquid fuel) to flame 58, which strikes against the outside surface of a double concave end plate 20a, firmly affixed and sealed to the extreme end of the steam generating chamber 20, and heating said end plate 20a.

After activation of flame 58 and end plate 20a having attained sufficient temperature, a pressurized water supply is activated with water flowing through injection pipe 22 which penetrates steam generating chamber 20 and continues to the center thereof, where it bends 90° in the direction of end plate 20a, and continues a short distance to terminate in spray nozzle 60, tranforming the water into a spray which strikes heated end plate 20a and is converted into steam within the steam generating chamber 20.

Naturally, there must be means of varying the gas pressure and the caloric output of flame 58, and also varying the rate of water being injected in order to vary the power output of the invention to cope with changing demands. The water pump must provide sufficient pressure to overcome the internal pressure of steam generating chamber 20 and have a varying discharge capability. Thus, the gas pressure control and the water pump control must be interconnected so that they will be controlled together and, proportionally. This is accomplished by means of a linkage system, either mechanical, electrical or electronic/electrical, the construction of which should be well within the capability of one skilled in the art.

Figure 6:
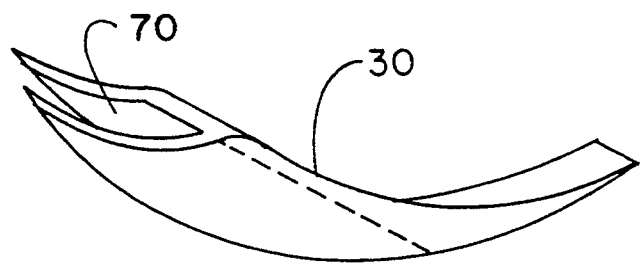
FIG. 6. is a perspective view of the "combination backstop for the power chamber and lifter/release for the power vanes" 30.

The generated steam, unable to escape through the end closed off by end plate 20a, is forced toward the other end of the steam generating chamber 20. There is passes through channel 70 in the graphite-impregnated "combination backstop for the power chamber and lifter/release for power vanes" 30 (see FIG. 1. and FIG. 6.) to power chamber 16 where the solid portion of the backstop 30, combined with its close proximity (0" to 0.002") of the high curved portion to the flywheel 10, prevents the steam from entering the transition chamber 16b. To accomplish this end, the backstop lifter/release 30 is firmly attached and sealed to the rim 14 of the engine housing 72 and the bottom plate 34 and the top cover plate 40.

Thus, the steam enters the power chamber 16 and encounters power arm 62 of the extended power vane 18, thrusting power arm 62 before it in a clockwise direction toward the zero pressure of the exhaust chamber 16a.

Steam pressure being maintained by the constant generation of steam within the steam generating chamber 20, power vane 18 continues to be forced in a clockwise direction while powering flywheel 10 to which it is attached in a clockwise direction also.

Eventually, the power vane 18 enters the area of the exhaust chamber where the pressure is discharged.

But, as one can see from FIG. 1, immediately before the pressure behind power vane 18 is discharged, the second power vane 18, which is diametrically opposed to the first power vane 18, has moved into position in the power chamber 16 to receive the steam pressure.

Thus, the process continues with the flywheel 10 under constant power, 360° each revolution.

Now, going back to the first power vane 18, as it leaves exhaust chamber 16a it enters transition chamber 16b. There it merely rides, being attached to flywheel 10 which is now being powered by the second power vane 18, until it begins to encounter the "combination backstop for power chamber and lifter/release for power vanes" 30. This instrument gradually lifts the power vane 18 as it continues its rotation until it is in a fully retracted postion 18a in recess 26 in flywheel 10 as it passes over the highest portion of the "combination backstop and lifter/release for power vanes" 30.

Figure 4:
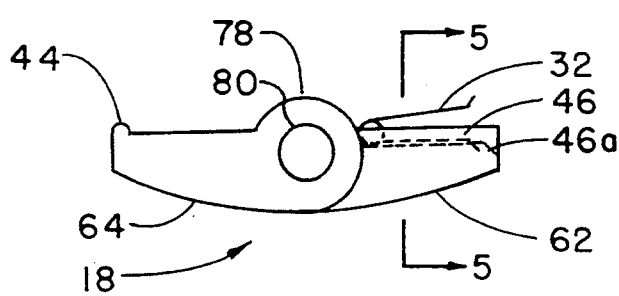
FIG. 4. is a plan view of the power vane 18.
Figure 5:
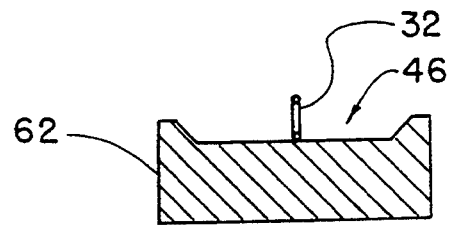
FIG. 5. is a section view of FIG. 4.

Immediately upon passing over this high point, the "combination backstop for power chamber and lifter/release for power vanes" 30 begins to release power vane 18 which is impelled toward the open position by hairpin spring 32, attached between power vane 18 and flywheel recess 26, and by the kinetic force of the moving steam (see FIGS. 1, 4 & 5). Thus, power vane 18 is fully extended by the time it arrives in the power chamber 16, in position to receive the thrust of steam from the steam generating chamber 20. The hairpin spring 32 also insures that there is an extended power vane 18 in the power chamber 16 even after the engine has been out of operation. Thus, the invention does not require a power assisted start, only a renewed generation of steam, to resume operation.

Figure 2:
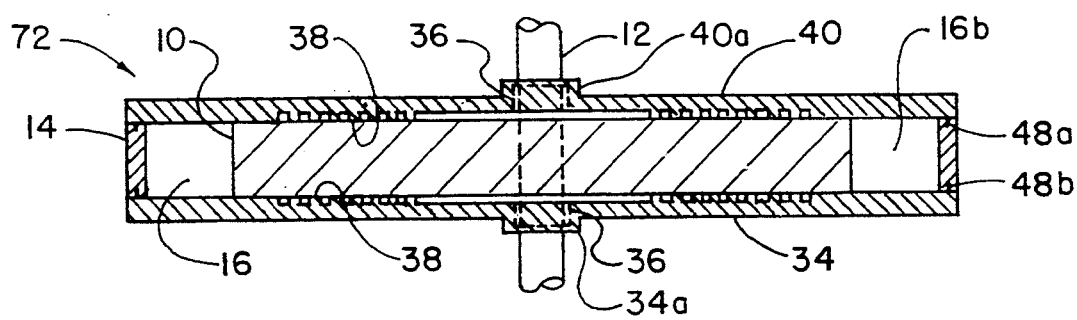
FIG. 2. is a section elevation view.

To further elaborate upon the invention and the construction thereof, refer to FIGS. 1 & 2.

Here it may be seen that flywheel 10 has a flattened cylindrical form, and let it be noted that it is constructed of steel. In the center of the flywheel 10 there is a hole, through which passes the drive shaft, also steel The drive shaft 12 is securely connected to the flywheel 10 by key or other means.

Surrounding flywheel 10 and allowing sufficient space between the outer edge of flywheel 10 and the rim 14 of the engine housing 72 to form the power chamber 16, exhaust chamber 16a and the transition chamber 16b is an aluminum engine housing 72. The engine housing 72 comprises a circular rim 14 with openings for attached exhaust duct 16c and attached and sealed steam generating chamber 20, and aluminum top cover plate 40 and an aluminum bottom plate 34. As seen in FIG. 2, top cover plate 40 and bottom plate 34 each have a plurality of raised concentric rings 38 on the inside surfaces facing, and in close proximity (0" to 0.002" clearance) to the top and bottom surfaces of steel flywheel 10. The rings 38 act as a seal to prevent the pressurized steam from the power chamber 16 from slipping between the flywheel 10 and the top and bottom plates 40 & 34 of the engine housing 72.

Figure 7:
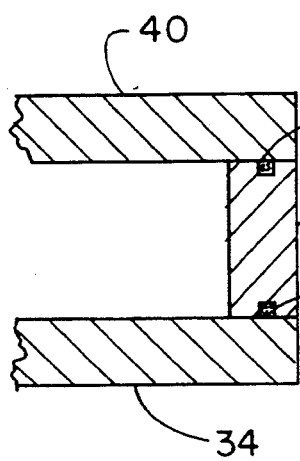
FIG. 7. is a detail section view of the annular seal 48 in grooves of the top and bottom of engine housing rim 14.

Referring now to FIGS. 2 & 7, we see that annular seals 48a and 48b are placed in continuous grooves all the way around the top and bottom of the rim 14 of the engine housing 72, forming a sealed condition between the rim 14 and the top and bottom plates 40 & 34. Annular seals 48a and 48b perform the sealing function of a gasket, but, unlike the gasket which yields under the pressure of the tightening process, the annular seals 48a and 48b permit the surfaces of plates 40 & 34 to fit flush against the top and bottom surfaces of rim 14. This enables the machinist fabricating the invention to observe a 0" to 0.002" clearance between the top and bottom plates 40 & 34 and the top and bottom edges of power arm 62 of power vane 18. Top plate 40 and bottom plate 34 are each firmly connected to rim 14.

Referring to FIG. 2, we see that the drive shaft 12 passes through holes in the center of top cover plate 40 and the center of bottom plate 34. Surrounding these holes, the material of plates 40 and 34 are widened and thickened to form bushing housings 40a and 34a to accomodate self-lubricating bushings 36 between shaft 10 and bushing housings 40a and 34a.

Figure 3:
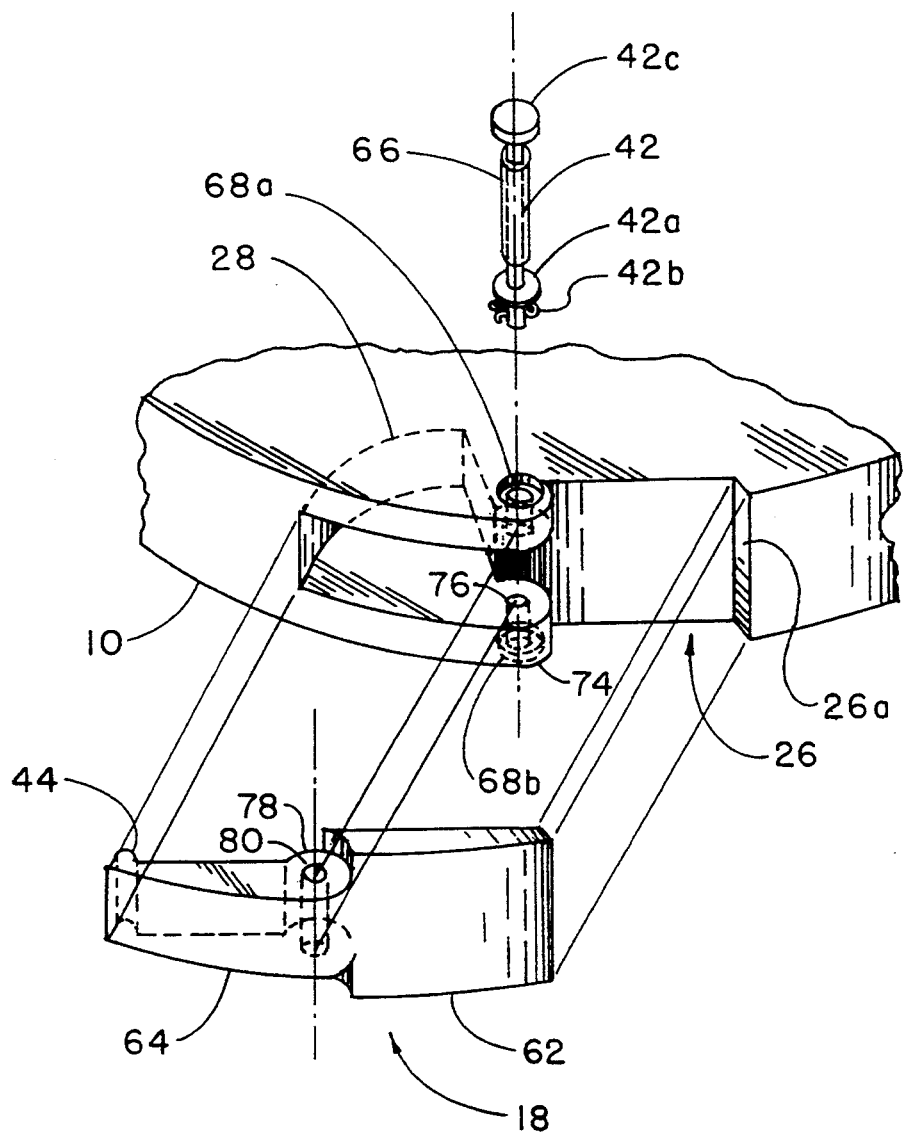
FIG. 3. is an exploded top perspective view of the flywheel 10, the power vane 18 and the hinge pin 42.

Two steel power vanes 18, diametrically opposed, are each attached to the flywheel 10 by means of a hinge pin 42, which is held in place by a head 42c on one end and a washer 42a and a cotter pin 42b on the other (FIG. 3). Protrusions at either end shall be recessed below the surface of the flywheel 10 in recesses 68a and 68b.

Flywheel 10 has, on the counterclockwise side of the hinge pin 42, a recess 26 to receive power arm 62 of the power vane 18 in the retracted position and, on the clockwise side of hinge pin 42, a cavity 28 to receive anchor arm 64 of power vane 18 in both the retracted position and the position extended 90° therefrom. A connecting portion of flywheel 10 is removed between recess 26 and cavity 28 to accomodate a rounded center portion 78 of power vane 18, but leaving parts of flywheel 10 surrounding hinge pin intact, top and bottom, so as to form two rounded ears 74.

These ears 74 with holes 76 and the rounded center portion 78 of power vane 18 with hole 80 are joined together by hinge pin 42, encased in self-lubricating bushing 66, passing through holes 76 & 80 to form a hinge about which power vane 18 rotates 90°.

FIGS. 1, 3, 4 and 5 gives more detailed information concerning the shape and function of power vanes 18, two required. FIGS. 1, 3 and 4 show that when power vane 18 is in the fully retracted position within the recess 26 and cavity 28 of flywheel 10, the exposed face of power vane 18 is curved to fit flush with the rim 14 of flywheel 10, i.e., the radius of the curve of power vane 18 is equal to the radius of flywheel 10.

Furthermore, one sees that the arms of power vane 18 on either side of hinge pin 42 are approximately equal in length. The power arm 62 of power vane 18 that extends into the power chamber 16 and retracts into the flywheel recess 26 is wider than the anchor arm 64. This is because the power arm 62 must completely occupy power chamber 16 in its extended position in order to receive the full thrust of the steam and to eliminate any appreciable slippage of the steam around the 3 sides of the power arm 62. In order to accomplish this, the width and length of power arm 62 must conform with the dimensions of the power chamber 16 by a maximum clearance of 0.002".

Looking at the power arm 62 shown in FIGS. 1, 4 and 5, one sees that there is a channel recess 46 in the backside of power arm 62 (as opposed to the curved face), and the end of channel recess 46 terminates in bevel 46a, effecting an enlargement of sorts. Likewise, in the corresponding end of flywheel recess 26 there is also a bevel 26a tapering outward toward the rim of flywheel 10. Thus, with power arm 62 fully retracted, channel recess 46 and bevel 46a in the power arm 62 combine with the bevel 26a in the flywheel recess 26 to provide for the ready passage of steam pressure from the power chamber 16 to the backside of power arm 62. This equalizes the pressure on the front and back sides of power arm 62, eliminating any pressurized resistance to the extending movement of power vane 18 from a retracted position.

Looking at FIGS. 1, 3 and 4, we see that the anchor arm 64 on the other side of power vane 18 retracts into the cavity 28 of flywheel 10 and anchors against the far side of the cavity 28 when power arm 62 is in its fully extended position (90° from the retracted position). Note that this anchor arm 64 is smaller than the power arm 62 to enable it to fit into the slot-like cavity 28. Also, it has no sealing function and therefore does not require the close clearance tolerance of power arm 62.

Also note the rounded ridge 44 on the extreme end of anchor arm 64 that runs the full width of the arm. This ridge 44 anchors against the far side of cavity 28 when power vane 18 is in its fully extended position and serves as a fulcrum for the lever (power vane 18) acting upon the load (hinge pin 42). Thus, by virtue of the ridge 44 (fulcrum) being the maximum distance from hinge pie 42 (load), the force acting upon hinge pin 42 is minimized.

Now, to examine hairpin spring 32 that imp ells power vane 18 from the retracted position to the extended position, it is necessary to refer to FIGS. 1, 4 and 5. FIG. 1 shows the hairpin spring 32 in an overall view, showing the positioning and relationship of the parts to the rest of the invention. FIGS. 4 and 5 are more specific, showing hairpin spring 32 set in the center of channel recess 46 in power arm 62 of power vane 18, with the leg of hairpin spring 32 extending along channel recess 46 and the end of the leg being bent at an angle and anchored in a small hole near the end of channel recess 46. The corresponding leg of hairpin spring 32 extends about an equal distance and is also bent and anchored in a similar angled hole in the bottom of flywheel recess 26. If it is found to be desirable, a small groove may be cut in the bottom of channel recess 46 to receive the circular portion of the spring, the leg of the spring, or both.

FIG. 1 shows a safety valve 56 positioned on the wall of the steam generating chamber 20. This safety valve 56 is designed to open at a pressure substantially above normal operating pressure and yet well below pressures capable of damaging or rupturing the engine, should too heavy a load be encountered or should a part jam to prevent the rotation of the flywheel 10.

Another embodiment of the invention is the same as the preferred embodiment just described, but with an alternate means of internally generating a continuous supply of steam.

Figure 8:
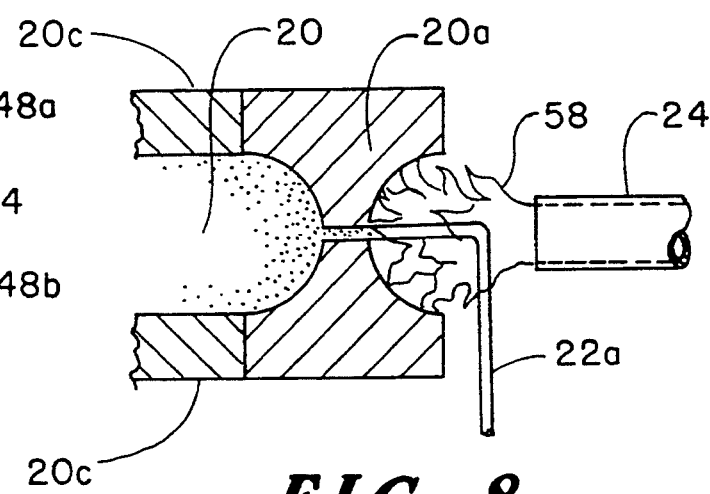
FIG. 8. is a section detail of Embodiment No. 2 of means of internally generating a continuous supply of steam.

Refer now to FIG. 8. Pipe 24 supplies a flammable gas or vaporized liquid fuel under pressure to flame 58, which strikes against the outside concave surface of a double concave end plate 20a, firmly attached and sealed to the extreme end of the steam generating chamber 20, and heating said end plate 20a. After end plate 20a has attained sufficient temperature, a pressurized water supply is activated, with water flowing through injection pipe 22a which enters the center of flame 58, where it bends 90° to continue on within flame 58 while the water within pipe 22a receives heat from flame 58, until the pipe penetrates end plate 22a to exit within the steam generating chamber 20. The water carried by the pipe 22a, having been heated by immersion in flame 58 and passage through the heated end plate 20a, is vaporized and emerges into the steam generating chamber 20 in the form of steam.

Obviously, there must be means of varrying the gas pressure and thus the caloric output of flame 58, and also varying the rate of water being pumped in order to vary the power output of the invention to cope with shifting demands. The pump supplying the water must provide sufficient pressure to overcome the internal pressure of the steam generating chamber 20 and have varying discharge capability. The gas pressure control and the water pump control must be interconnected so that each will be controlled together and proportionally. This is accomplished by a linkage system, either mechanical, electrical or electronic/electrical, the construction of which should be well within the capability of one skilled in the art.

Still another embodiment of the invention is the same as the preferred embodiment previously described, but with an alternate means of internally generating a continuous of steam, now described.

Figure 9:
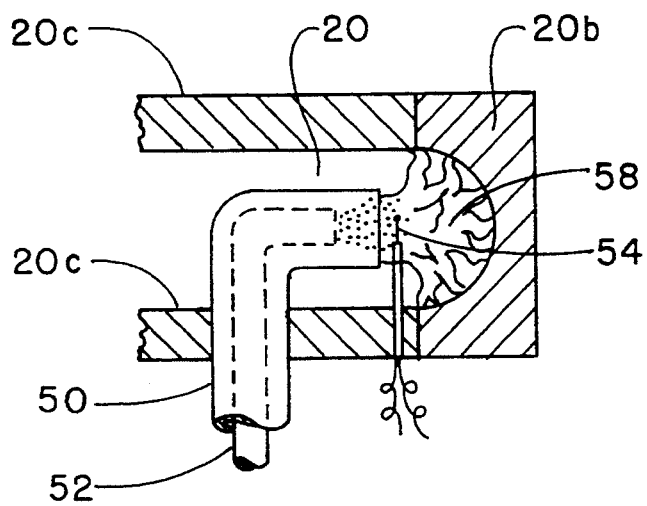
FIG. 9. is a section detail of Embodiment No. 3 of means of internally generating a continuous supply of steam.
Figure 10:
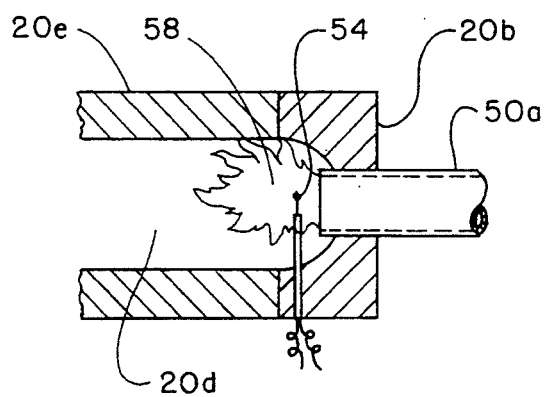
FIG. 10. is a section detail of means of a continuous internal combustion for the rotary internal combustion engine.
Figure 11:
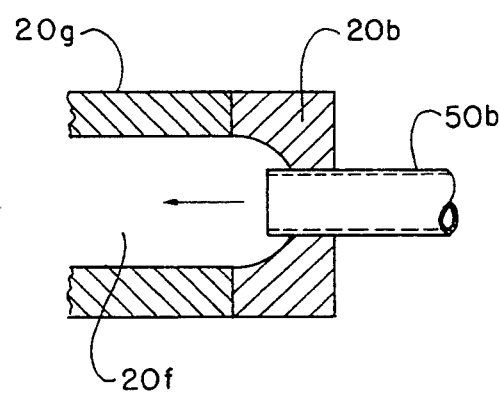
FIG. 11. is a section detail view of means of introducing pressurized hydraulic fluid into the hydraulic fluid receiving chamber of the rotary hydraulic motor.

Refer to FIG. 9. Here one sees two concentric pipes, the inner pipe 52 carrying pressurized air with dispersed particles of water, and the outer pipe 50 carrying pressurized flammable gas (or vaporized liquid fuel). Of course, if it is found to be advantageous, this arrangement may be reversed.

The gas and air mixture (devoid of water particles) emerging within the steam generating chamber 20 from the ends of concentric pipes 50 and 52 is ignited by electric igniter 54, creating flame 58 which strikes against the inside concave surface of the single concave end plate 20b, firmly attached and sealed to the extreme end of the steam generating chamber 20. When end plate 20b has attained sufficient temperature, the dispersed particles of water is activated to join the air flowing through pipe 52, continuing on through flame 58. Any water particles not vaporized by flame 58 strike the heated end plate 20b and are transformed to steam.

Obviously, there must be a means of varying the gas pressure and thus the caloric output of flame 58, and also of varying the density of the water particles being injected in order to vary the power output of the invention to cope with the changing demands. The pump supplying the air dispersed with water particles must provide sufficient pressure to overcome the internal pressure of the steam generating 20 and have a varying discharge capability. Thus, the gas pressure control and the air dispersed with water particles pump control must be interconnected so that they operate together and proportionally. This is accomplished by a linkage system, either mechanical, electrical or electronic/electrical, the construction of which should be well within the capability of one skilled in the art.

Advantages of the invention include the following:
Quick start-up and a continuous generation of steam, accomplished by the three embodiment of means of generating a continuous supply of steam.
Self-starting, brought about by the design and positioning of the power vanes, steam generating chamber and exhaust chamber, and also the springs that extend the power vanes, so that the engine is ready to start itself in any given position of the flywheel.
A higher degree of efficiency, accomplished by: the elimination of wasteful cycles of operation, such as intake, compression and exhaust; the elimination of recrocating parts with the consequent inertial resistance; virtual elimination of internal friction due to the 0" to 0.002" clearance between sealed adjacent moving parts.
Ease of manufacture and lower fabricating costs because it has only 3 major moving parts (considering the flywheel and drive shaft as one operating unit).
Dependability and long life, achieved by the simplicity of design.
Ability to run on a variety of fuels, because the power source is a simple, unrestricted flame which will burn well on gasoline, kerosene, alcohol, propane or natural gas.
The elimination of the need for oil for lubrication, achieved by the 0" to 0.002" clearance between adjacent moving parts that require a sealed condition, the employment of self-lubricating bushings and the use of a graphite-impregnated lifter/release for power vanes.
Lower internal operating temperature with the attending benefits is accomplished by the absorption of heat by the transformation of water into steam and the lower internal drive pressure requirements.
Virtually non-polluting and environmentally safe, due to the fact that the invention is powered by a clean blue flame, the internal operating temperature is relatively low (as cited above) and there is no presence of oil, a principal contaminant in conventional engines.
It lends itself readily to cellular, modular or "stacking" construction, due to the simplicity of design and the flattened, cylindrical shape of each engine unit, so that a plurality of units may be combined to produce the power requirements for a given need. This may be accomplished by elongating a common shaft to accomodate the number of units desired, or by mechanically coupling the drive shafts of the individual units.

The foregoing description of the invention is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A rotary engine, self-starting with a positive displacement and powered through 360° of each revolution, comprising:
   a flattened, cylindrical flywheel;
   a drive shaft, penetrating the center of and connected to said flywheel;
   2 recesses in the outer, circular portion of said flywheel, diametrically opposed to one another;
   2 cavities in the outer, circular portion of said flywheel, in close proximity to said recesses and diametrically opposed to one another;
   2 retractable power vanes, diametrically opposed to each other and hinged about midway along the length of each vane to the outer, circular portion of said flywheel, said power vanes capable of rotating 90° to about the hinge from a completely retracted position within said recess and said cavity of said flywheel to a position where one side of said hinged power vane is completely extended away from said flywheel while the other side is fully retracted into said cavity and anchored against the farthermost inside surface of said cavity;
   2 power arms, each of which is that side of said hinged power vane that extends away from said flywheel and receives power in the extended position;
   2 anchor arms, each of which is that side of said said hinged power vane that retracts into said cavity and anchors against the farthermost inner surface of said cavity;
   2 compressive springs, each connectively placed between said power arm of said power vane and said recess in said outer, circular portion of said flywheel;
   an engine housing, comprising a top cover plate, a bottom plate and a circular rim joining said plates at their outer perimeters, said housing enclosing said flywheel and providing a space between said outer, circular surface of said flywheel and said circular rim of said engine housing;

a power chamber, exhaust chamber and transition chamber in said space provided between said outer, circular surface of said flywheel and said circular rim of said engine housing;

a "combination backstop for the power chamber and lifter/release for the power vanes" with a curved, cam-like surface facing said outer, circular surface of said flywheel, said cam-like surface having a high point about midway along its length and in close proximity to said outer, circular surface of said flywheel, said cam-like surface alternately lifting and releasing each said power vane upon passage thereover, said "combination backstop, lifter/release" anchored and sealed to said top cover plate, bottom plate and said circular rim of said engine housing and being located between said transition chamber and said power chamber, said "combination backstop, lifter/release" having a channel running through same and exiting into said power chamber;

a tubular power generating chamber, immediately preceding in a clockwise direction said channel in the "combination backstop, lifter/release", and, in combination with said channel running tangent to the point of intersection with said power chamber, one end of said tubular power generating chamber affixed and sealed to said circular rim of said engine housing and connected through an opening in said rim to said channel in said "combination backstop, lifter/release", and thence connected to the power chamber, and the other end of said tubular power generating chamber hereby designated as "the outer end";

a tubular exhaust duct on a tangent point to and immediately following said power chamber in a clockwise direction, said tangent point being approximately 245° in a clockwise direction from said high point of said "combination backstop, lifter/release", one end of said tubular exhaust duct affixed and sealed to said circular rim of said engine housing and connected through an opening in said rim with said power chamber;

means of generating power within said power generating chamber.

2. The engine of claim 1, wherein said means of generating power within said power generating chamber comprises:
a flame external to said power generating chamber;
a pipe carrying pressurized flammable gas or atomized liquid fuel to said flame;
a double concave end plate, firmly affixed and sealed to said outer end of said tubular power generating chamber, with the concave surface of said end plate external to said power generating chamber and receiving heat from said flame;
a pressurized water injection pipe, which enters said flame and continues on within said flame to a sealed penetration of said heated end plate, the water inside said pipe being converted to steam, which emerges within said power generating chamber.

3. The engine of claim 1, wherein said means of generating power within said power generating chamber comprises:
a flame external to said power generating chamber;
a fuel pipe, penetrating in a sealed manner said power generating chamber, carrying pressurized flammable gas or atomized liquid fuel to said flame;
a pipe, within and concentric to said fuel pipe, supplying pressurized air for the flame and atomized water for the steam;
a single concave end plate, firmly affixed and sealed to said outer end of said tubular power generating chamber, the concavity of said end plate turned toward said flame within said power generating chamber;
an electric igniter, located within said power generating chamber, which ignites the mixture of said pressurized flammable gas or atomized liquid fuel and said pressurized air, forming said flame, with the atomized water particles moving within said flame and being transformed into steam, with any surviving particles of water striking said heated end plate and also being converted to steam.

4. The engine of claim 1, wherein said retractable power vanes further comprise a channel-type recess on the inside face of said power arm proximate to said flywheel recess in the retracted position, said channel-type recess extending the full length of said power arm.

5. The engine of claim 1, wherein said retractable power vanes further comprise a bevel on the end of said channel-type recess fartherest removed from said hinge, said bevel sloping outwardly from said channel-type recess toward the obverse side of said power arm.

6. The engine of claim 1, wherein said retractable power vanes further comprise a raised, rounded ridge on the end of said anchor arm fartherest removed from said hinge, and running the entire width of said anchor arm, said ridge anchoring against the farthermost inside surface of said flywheel cavity when said power arm is in its fully extended position.

7. The engine of claim 1, wherein said means of generating power within said power generating chamber comprises:
a flame internal to said power generating chamber;
a fuel pipe carrying a pressurized mixture of flammable gas or atomized liquid fuel and air;
an end plate, firmly affixed and sealed to said outer end of said power generating chamber, and penetrated in a sealed manner by said fuel pipe;
an electric igniter, located within said power generating chamber.

8. The engine of claim 1, wherein said means of generating power within said power generating chamber comprises:
a pipe carrying pressurized fluid;
an end plate, firmly affixed and sealed to said outer end of said tubular power generating chamber, said end plate being penetrated by said pipe, thus introducing pressurized fluid into said power generating chamber.

9. The engine of claim 1, wherein said means of generating power within said power generating chamber comprises:
a flame, external to said power generating chamber;
a pipe carrying pressurized flammable gas or atomized liquid fuel to said flame;
a double concave end plate, firmly affixed and sealed to said outer end of said tubular power generating chamber, one concave surface of said end plate being internal to said power generating chamber and the other concave surface being external to said power generating chamber, said external surface receiving heat from said flame;
a water injection pipe, penetrating said power generating chamber in a sealed manner, terminating in a nozzle which directs a spray of atomized water against the heated internal surface of said end plate, generating steam within said power generating chamber.

* * * * *